G. ROHR.
Grain Drill.
No. 7,513.
Patented July 16, 1850.
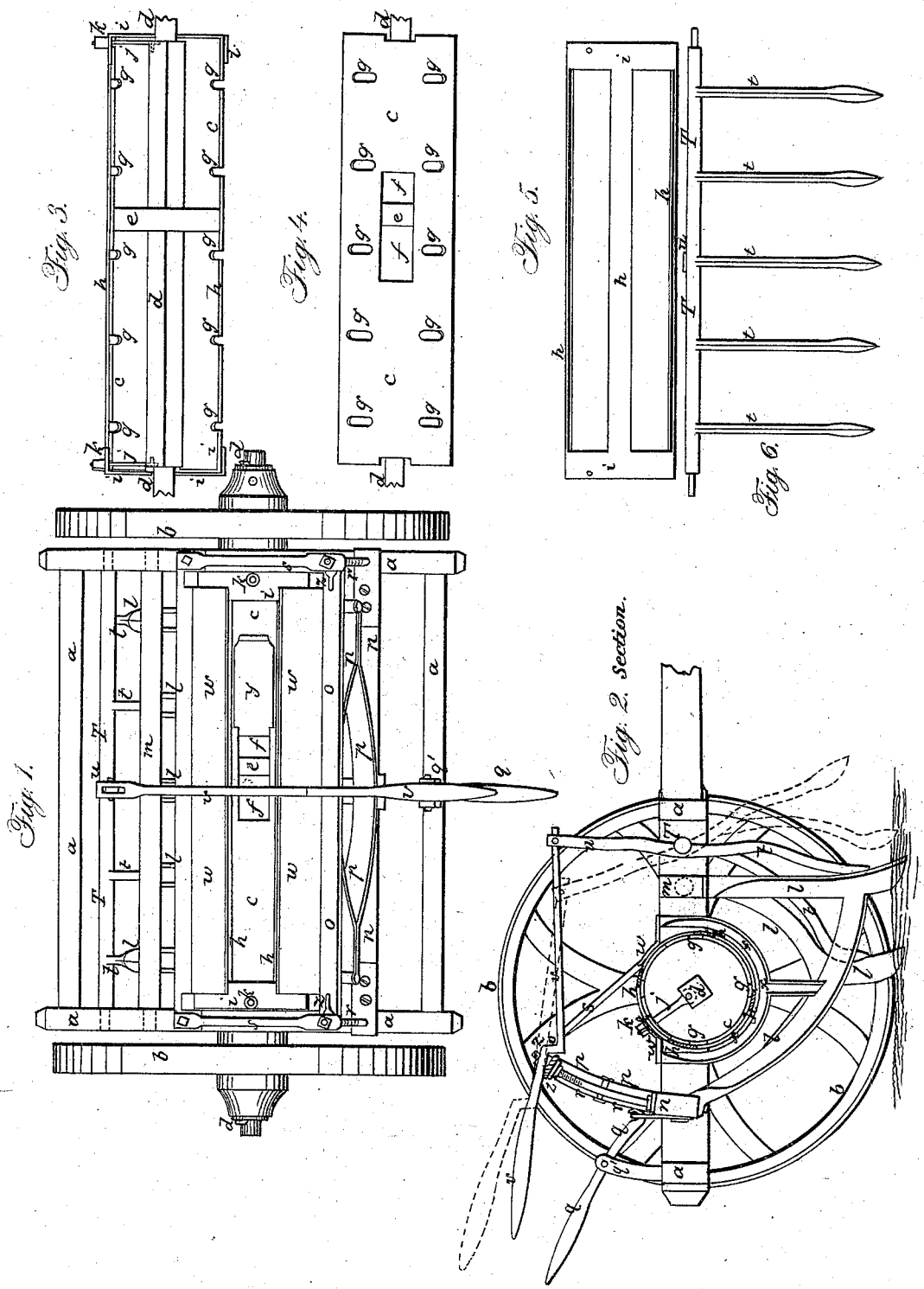

UNITED STATES PATENT OFFICE.

GEO. ROHR, OF CHARLESTOWN, VIRGINIA.

IMPROVEMENT IN SEEDING APPARATUS OF SEED-PLANTERS.

Specification forming part of Letters Patent No. 7,513, dated July 16, 1850.

*To all whom it may concern:*

Be it known that I, GEORGE ROHR, of Charlestown, in the county of Jefferson and State of Virginia, have invented certain new and useful Improvements in Machines for Planting Seed; and I do hereby declare the following to be a full, clear, and exact description thereof, reference being had to the drawings hereunto annexed, and making part of this specification.

The improvements which I have made are as follows: First, in constructing the rotary cylinder (in which the seed to be conducted to the depositing-tubes is placed) with parallel plates secured together by circular heads, which also form the ends of the cylinder by which they are made to serve the purpose of valves for partially or entirely closing the apertures in the cylinder through which the seed passes to the depositing-tubes, and thus regulate or check the discharge of the seed; secondly, in the arrangement and combination of elliptical spring transverse rising-and-falling beam, to which the rear ends of the depositing-tubes are affixed, and hand-lever, by which the depositing-tubes are raised and lowered simultaneously; thirdly, in the arrangement of a series of vibrating clearers directly in front of the depositing-tubes, actuated by a jointed hand-lever extending upward and rearward from a horizontal transverse rock-shaft, to which the vibrating clearers are also affixed, the use of which is to clear away weeds, grass, stubble, and other obstructions that may have a tendency to accumulate around the depositing-tubes, and which so often renders it necessary to raise them to pass over said obstructions, and thus interrupt the regular and proper sowing of the seed; fourthly, in the use of segmental shields or covers on either side of the upper portion of the cylinder, and intermediate semicircular conducting spouts or gutters beneath the same, in connection with said cylinder, by which any waste of the seed through the openings is prevented during the rotation or its discharge from the openings before passing the segmental shields or covers, when it is discharged into the semicircular spouts or gutters and conducted thence to the depositing-tubes.

In the annexed drawings, Figure 1 represents a plan or top view of the machine. Fig. 2 is a vertical section, the depositing-tubes being lowered as in operation, and the hand-lever of the vibrating clearers properly secured, and its position when drawn rearward to actuate the clearers represented by dotted lines. Fig. 3 is a longitudinal section through the rotating perforated cylinder, showing more clearly the arrangement of the valves in connection with the cylinder. Fig. 4 is a view of the cylinder detached from the parallel plates or valves and frame. Fig. 5 is a view of the parallel plates or valves. Fig. 6 is an elevation of the finger-bar and fingers.

Where the designating letters occur on the above figures they indicate like parts.

$a$ is the frame, made to suit the arrangement of the several parts of the machine.

$b\ b$ are the supporting and propelling wheels, fixed to the ends of the cylinder-axle and turning with the same.

$c$ is the hollow metallic rotating cylinder, secured upon the axle-tree $d$ by the central partition, $e$, and turning with the same. This cylinder is open at both ends and contains an opening, $f$, on either side of the central partition, $e$, at which the seed is introduced to the interior thereof, said opening being closed by a segmental slide-door, and is also provided with a series of parallel rows of oblong openings, $g\ g$, through which the seed is discharged regularly during its rotation.

$h\ h$ are the parallel plates or valves, placed lengthwise over the periphery of the cylinder adjacent to each row of openings therein and connected by two circular heads, $i\ i$, which overlap and form the ends of the cylinder, said heads containing openings corresponding with the journals of the axle-tree and moving independent of the same in adjusting the valves.

Adjacent to the heads $i\ i$ of the cylinder and attached to the revolving axle-tree by screw-bolts are two bars, $j\ j$, projecting through holes in the rim portion of the heads $i\ i$ to receive knobs or handles $k\ k$, by which to lay hold to turn the plates or valves from or toward the rear of the machine, which will have the effect of increasing or diminishing the area of the oblong openings in the cylinder, and of course in the same proportion the discharge of the seed; or they may be closed or opened entirely, there being notches or slots in the ends of the cylinder to govern the full movement of the bars *j j* and valves or parallel plates.

*l l* are the drill-teeth and depositing-tubes, made in the form represented in the drawings, and arranged in alternate order in and out, or alternately projecting in advance of each other, as shown in Fig. 2, which has the effect of steadying the motion of the machine in stony and uneven ground, having their front portions attached to a pivoted beam *m* in front of the cylinder, and their curved branches to a rising and falling beam, *n*, at the rear of the same.

To the beam *n* and a bar, *o*, rising above it, is secured an elliptical spring, *p*, which is contracted when the beam *n* and depositing-tubes are raised, and which, when liberated, forces down the beam *n* and drill-teeth, ready for operation. This is effected by means of a hand-lever, *q*, having its fulcrum in a stud, *q'*, rising from the frame, and its inner end attached to the beam *n*, so that by depressing the outer end of the lever *q* the beam *n* and drill-teeth and depositing-tubes will be made to rise in the arc of a circle, scribed from the pivoted beam *m*, the ends of the beam *n* being made to rise and fall over curved rods *r r*, projecting from the side beams of the frame *a*, to the ends of which rods the bar *o* is affixed, and which are held firmly by two bent brace-rods, *s s*. Nuts *z* are put on the screw-rods *r r* above and below the bar *o* for increasing or diminishing the force of the spring *p*. By this arrangement the drill-teeth and depositing-tubes are permitted to yield or give when struck by a stone or other obstruction that may not have been removed by the action of the vibrating clearers.

The vibrating clearers *t*, arranged in front of the drill-teeth, are composed of iron bars *t*, curved in or out to suit the position of the drill-teeth, and are made sharp on their lower front edges for cutting away sticks, grass, stubble, &c., that may gather around the drill-teeth, and are also slightly concave on their back edges to fit over and against the front portion of the drill-teeth. These vibrating clearers are attached to a horizontal transverse rock-shaft, T, from the center of which rises an arm, *u*, to which is connected by a joint-pin a hand-lever, *v*, extending rearward to within reach of the operator, and having a shoulder formed thereon, or a pin for resting against the horizontal bar *o* to hold the clearers securely against the drill-teeth when not required to be vibrated.

In order to actuate the clearers, the operator need only slightly elevate the handle of the lever and draw it rearward, which will cause the clearers to advance or move forward in the arc of a circle, and to recede when the lever is made to advance, and thus the drill-teeth will be kept clear, and the due operation of the planting greatly facilitated.

The segmental shields or covers *w* are placed on either side of the upper portion of the cylinder, and nearly the length of the same, but not touching it, and are secured to the frame by screw-bolts, leaving a space between their upper edges, which are slightly curved upward to prevent the valves catching against them in rotating with the cylinder. To these segmental shields or covers *w* are attached semicircular spouts or gutters *x*, arranged beneath the cylinder and corresponding to the circular rows of oblong openings in the same. Thus it will be seen that by the use of the segmental shield and semicircular spouts the seed will be discharged from the cylinder into the said semicircular spouts without the least waste, and thence to the depositing-tubes into the furrows made by the drill-teeth.

The operation of this seeding-machine having been fully described in connection with the description of the several parts thereof, it will be sufficient to say that the seed to be sown is placed in the cylinder through the opening on either side of the central partition and closed by the door *y*. The hand-lever *v* of the vibrating clearers *t* is then moved toward the front of the machine and secured, as shown in Fig. 2. The hand-lever *q* for elevating the drill-teeth being liberated, and the drill-teeth and depositing-tubes depressed by the action of the elliptical spring *p*, and the oblong openings in the cylinder regulated by the valves to sow the desired quantity of seed according to the quality and nature of the soil, the machine is made to move forward and the seeding-cylinder to rotate with the axle-tree of the propelling wheels and the seed discharged regularly and uniformly from the cylinder.

It will of course be understood that one of the propelling or driving wheels must be fixed permanently to the axle-tree to which the seeding-cylinder is affixed to cause them to turn together. The other driving-wheel may turn loosely on the end of the axle-tree for the facility of turning the machine.

Having thus described the nature and construction of my improvements in seeding-machines, what I claim as my invention, and desire to have secured to me by Letters Patent, is—

1. The combination and arrangement of the segmental plates *h* or valves, secured together by circular rings and heads *i i*, and arranged over the circumference of the cylinder *c*, adjacent to the openings therein, with the rotating cylinder, constructed as described, for the purpose of partially or entirely closing the openings in the cylinder through which the seed passes to the depositing-tubes, and thus regulate or check the discharge of the seed, as described, and shown in the drawings.

2. The arrangement and combination of the elliptical spring *p*, rising and falling beam *n*, pivoted beam *m*, and hand-lever *q* with the depositing-tubes and drill-teeth, by which all the depositing-tubes and drill-teeth may be raised and lowered simultaneously, as described, without stopping the planting.

3. The arrangement of segmental shields or covers w on either side of the upper portion of the rotating cylinder c, in combination with the intermediate semicircular spouts or gutters x beneath the cylinder, by which any waste of the seed is prevented during the rotation of the cylinder, or its discharge from the openings before passing the segmental shields or covers, as described.

In testimony whereof I have hereunto signed my name before two subscribing witnesses.

GEORGE ROHR.

Witnesses:
 THOMAS D. HENSON,
 H. L. EBY.